(12) United States Patent
Wang (10) Patent No.: US 9,374,550 B1
(45) Date of Patent: Jun. 21, 2016

(54) TELEPHONE-AND-TELEVISION BOX ABLE TO BE PLACED VERTICALLY OR HORIZONTALLY AND PROVIDED WITH EXTENSIBLE FRAMES

(71) Applicant: COREMATE TECHNICAL CO., LTD., Taoyuan County (TW)

(72) Inventor: Robert Wang, Taoyuan County (TW)

(73) Assignee: COREMATE TECHNICAL CO., LTD., Taoyuan County (TW)

( * ) Notice: Subject to any disclaimer, the term of this patent is extended or adjusted under 35 U.S.C. 154(b) by 0 days.

(21) Appl. No.: 14/641,360

(22) Filed: Mar. 7, 2015

(51) Int. Cl.
| | |
|---|---|
| H04N 7/00 | (2011.01) |
| H04N 5/655 | (2006.01) |
| H05K 5/00 | (2006.01) |
| H05K 5/02 | (2006.01) |
| H02J 7/02 | (2016.01) |
| H04N 21/41 | (2011.01) |
| H04N 21/422 | (2011.01) |

(52) U.S. Cl.
CPC ............ *H04N 5/655* (2013.01); *H02J 7/025* (2013.01); *H04N 21/4126* (2013.01); *H04N 21/4222* (2013.01); *H05K 5/0017* (2013.01); *H05K 5/0217* (2013.01)

(58) Field of Classification Search
CPC ............ H04N 21/4126; H04N 21/43637; H04N 21/4222; H04N 5/4401; H04N 5/44; H04N 5/655; A63F 13/12; A63F 13/08; A63F 2003/086

USPC ............ 348/552; 725/106, 141, 153, 133; 463/41, 42, 46
IPC ...................... H04N 5/44,5/655, 7/00
See application file for complete search history.

(56) References Cited

U.S. PATENT DOCUMENTS

| | | | | |
|---|---|---|---|---|
| 2013/0027613 A1* | 1/2013 | Kim | ............ | H04N 21/4126 348/563 |
| 2015/0245166 A1* | 8/2015 | Lee | ............ | H04M 1/7253 455/41.2 |

* cited by examiner

*Primary Examiner* — Sherrie Hsia
(74) *Attorney, Agent, or Firm* — Ming Chow; Sinorica, LLC (57) ABSTRACT

A telephone-and-television box able to be placed vertically or horizontally and provided with extensible frames includes a main body that is electrically connected with a display. The main body is received therein with a set top box and provided thereon with a wireless induction charger for setting a remote control, which has wireless induction charging function and can serve as a handset of a mobile phone. The telephone-and-television box can be placed horizontally or vertically, and a plurality of extensible frames are disposed at the peripheral sides of the main body for setting and locking other peripheral devices and a display thereon. Thus, the telephone-and-television box of this invention is able to combine the functions of both TV and telephone and integrate other electronic peripheral devices.

5 Claims, 7 Drawing Sheets

TELEPHONE-AND-TELEVISION BOX ABLE TO BE PLACED VERTICALLY OR HORIZONTALLY AND PROVIDED WITH EXTENSIBLE FRAMES

BACKGROUND OF THE INVENTION

1. Field of the Invention

This invention relates to an intelligent electric product, particularly to a telephone-and-television box that is provided with extensible frames.

2. Description of the Prior Art

Along with development of the internet of things, industrial environment and market demand and development have also changed, and integration of home electric appliances has become a development trend of industry and market at present.

A common TV set is one of the electric appliances that are indispensable to each family, and usage rate of the TV set is higher than that of other electric appliances. However, except for being able to broadcast images and sounds and having function of connecting external broadcasting devices, a conventional TV set is unable to make a breakthrough and hence the function of the conventional TV set has no characteristic of diversification, and although conventional home telephones are used extensively, yet the conventional home telephones cannot tally with the tendency of digital integrallization of household electric appliances, thus unable to meet a user's needs.

In view of this situation, the inventor of this invention takes advantage of much experience and knowledge in related fields and draws inspiration from all sides and hence devises this invention.

SUMMARY OF THE INVENTION

The object of this invention is to offer a telephone-and-television box able to be placed vertically or horizontally and provided with extensible frames, able to integrate the functions of telephone and television and further integrate other electronic peripheral devices and thus devising a fully new type TV.

The telephone-and-television box able to be placed vertically or horizontally and provided with extensible frames in the present invention includes a main body electrically connected with a display. The main body is installed therein with a set top box and a SIM card and has a wireless induction charger provided thereon. A remote control can be optionally set on the wireless induction charger of the main body, able to remote control the set top box, and the remote control has wireless induction charging function and can serve as a handset of a mobile telephone. At least one extensible frame is provided at the peripheral side of the main body, able to be optionally retracted in the main body to form a first state or extended out of the main body to form a second state.

The telephone-and-television box able to be placed vertically or horizontally and provided with extensible frames in the present invention can be optionally placed horizontally or vertically and connected with the display, able to combine the functions of television and telephone, and the extensible frame can be stretched out of main body to form the second state for setting peripheral devices thereon. By so designing, the telephone-and-television box of this invention is able to integrate other electronic peripheral devices to achieve an effect of multi-functional integration, thus devising a fully new type TV by which a user can listen to sounds, watch images and converse with people.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
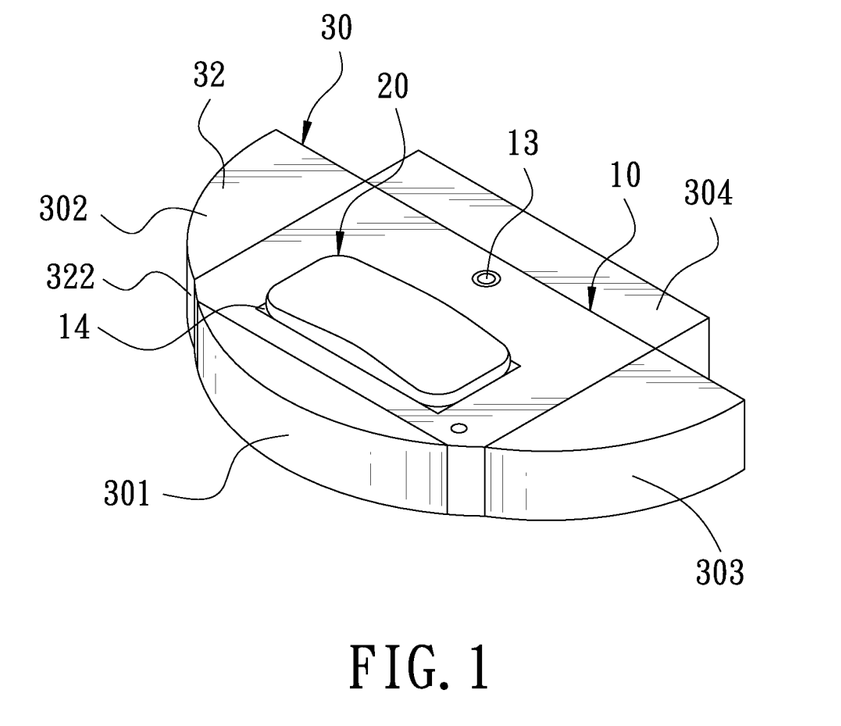
FIG. 1 is a schematic view of a telephone-and-television box able to be placed vertically or horizontally and provided with extensible frames in the present invention, illustrating that the extensible frames are in a closed condition.
Figure 2:
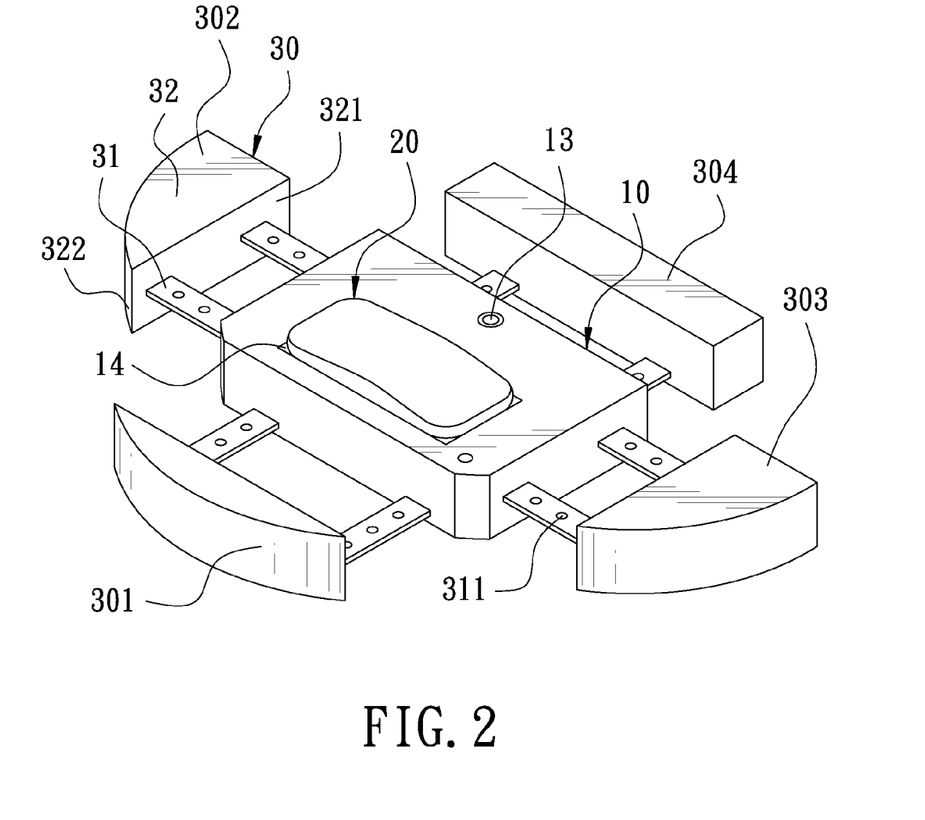
FIG. 2 is a schematic view of the telephone-and-television box able to be placed vertically or horizontally and provided with extensible frames in the present invention, illustrating that the extensible frames are extended outward.

A preferred embodiment of a telephone-and-television box able to be placed vertically or horizontally and provided with extensible frames in the present invention, as shown in FIGS. 1 and 2, includes a main body 10, a remote control 20, and a plurality of extensible frames 30 as main components combined together.

The main body 10 can be connected with a display 200, which can be a liquid crystal display. The main body 10 is installed therein with a set top box 11 and a SIM card 12 and provided thereon with a camera lens 13 and a wireless induction charger 14. The set top box 11 functions to have the display 200 broadcasting TV, the camera lens 13 is employed for video communication, and the wireless induction charger 14 can supply external devices with power in a way of wireless transmission. In this invention, the main body 10 is further provided with a mobile communication device for wireless transmitting data at high speed and the mobile communication device can be 3G or 4G mobile communication technique. In addition, the main body 10 is provided with a wired network device for the telephone-and-television box to transmit data by employing network transmission lines.

The remote control 20 can remote operate the set top box 11 to control the channel and the sound volume of TV broadcasting of the display 200. The remote control 20 has wireless induction charging function so the remote control 20 can be optionally set on the wireless induction charger 14 of the main body 10 for carrying out wireless induction charging via the wireless induction charger 14 and further, the remote control 20 can be used as a handset of a mobile phone for carrying out mobile communication by the remote control.

The extensible frames 30 are respectively provided at the peripheral sides of the main body 10, respectively defined to be a first extensible frame 301 and a second extensible frame 302 and a third extensible frame 303 and a fourth extensible frame 304. The first extensible frame 301 is at the front side, the second extensible frame 302 is at the left side, the third extensible frame 303 is at the right side and the fourth extensible frame 304 is at the rear side of the main body 10. Each extensible frame 30 is provided with plural retractable rods 30, which are parallel to the lower side of the main body 10 and respectively bored with plural locking holes 311. The retractable rods 31 can slide axially so that the retractable rods 31 can be either moved in the main body 10 to form a first state, or extended out of the main body 10 to form a second state. The retractable rods 31 have their ends transversely formed with a stop portion 32 and, in this invention, one side of the stop portion 32, which faces the main body 10, is a plane surface 321. The stop portion 32 of the first extensible frame 301 and the second extensible frame 302 and the third extensible frame 303 has another side formed into a cambered surface 322 so that, when the retractable rods 31 are moved in the main body 10 to form the first state, the stop portions 32 respectively positioned at the left side, the right side and the front side of the main body 10 are able to make the telephone-and-television box integrally formed into an arc shape. And, when the retractable rods are extended out of the main body 10 to form the second state, the extensible frames 30 can be used for setting the display 200 or other peripheral devices, such as speakers or external hard disks thereon and further, the display 200 and the peripheral devices can be firmly locked with the locking holes 311 of the retractable rods 31.

Figure 3:
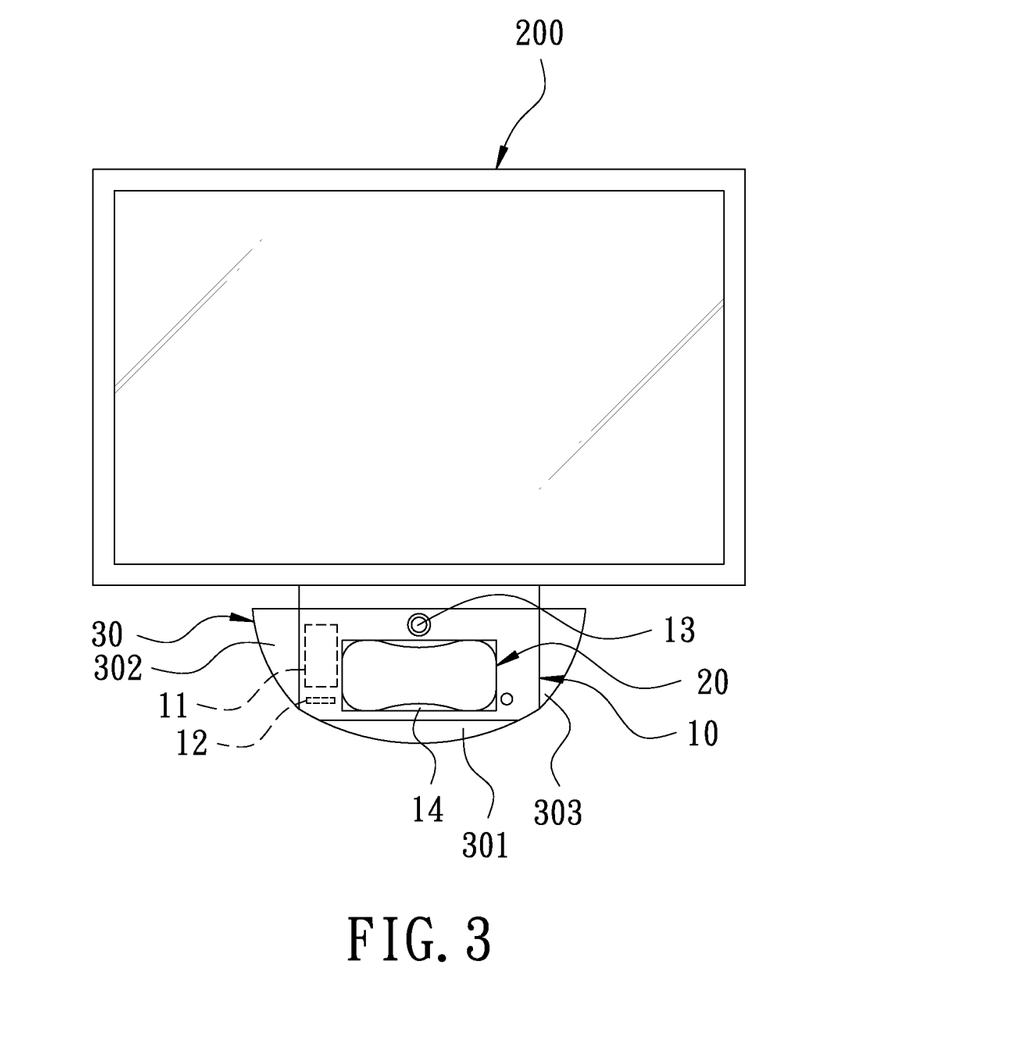
FIG. 3 is a schematic view of the telephone-and-television box able to be placed vertically or horizontally and provided with extensible frames in the present invention, illustrating that the telephone-and-television box is placed vertically and is in a closed condition.
Figure 4:
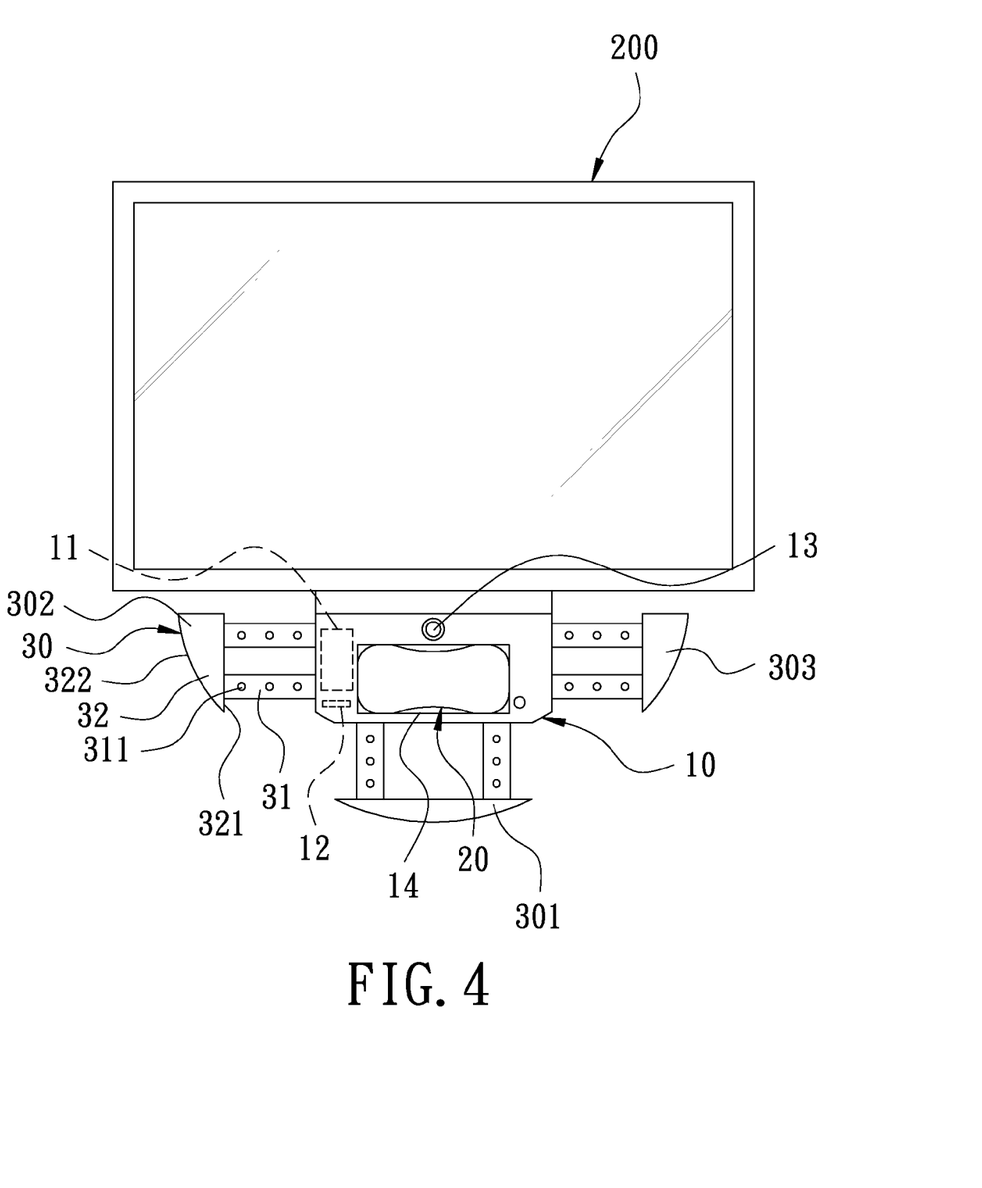
FIG. 4 is a schematic view of the telephone-and-television box able to be placed vertically or horizontally and provided with extensible frames in the present invention, illustrating that the telephone-and-television box is placed vertically and the extensible frames are in a stretching condition.
Figure 5:
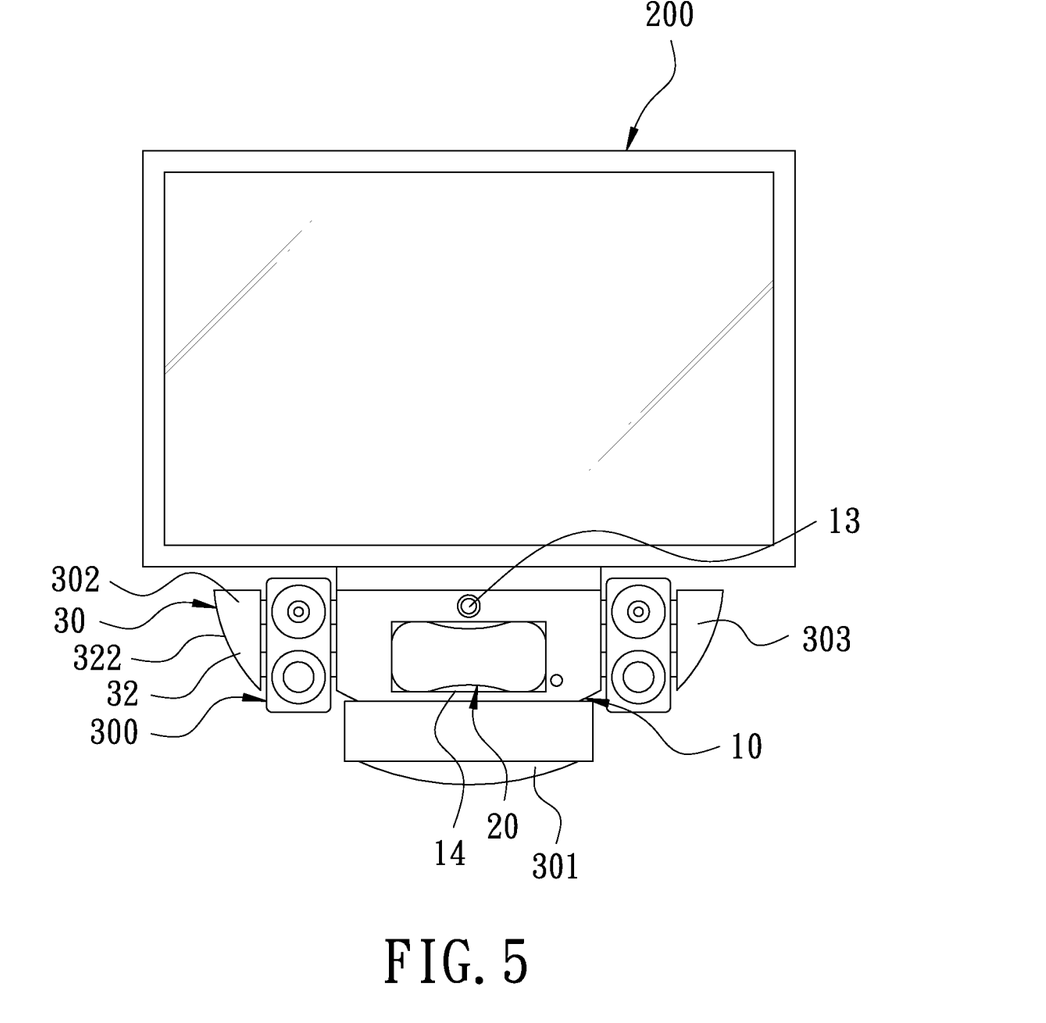
FIG. 5 is a schematic view of the telephone-and-television box able to be placed vertically or horizontally and provided with extensible frames in the present invention, illustrating that the telephone-and-television box is placed vertically to be used.

FIGS. 3-5 show that the telephone-and-television box of this invention is placed vertically for use. Also referring to FIGS. 1 and 2, the telephone-and-television box matching with the display 200 can be hung on a wall or placed vertically. When a user is to have speakers and other audio and video peripheral devices combined with the displayed 200 for use, simply pull out the extensible frames 30 to let the extensible frames 30 extended outward from the main body 10 to form the second state for setting the speakers 300 and other peripheral devices thereon and having them locked with the locking holes 311 of the retractable rods 31 and fixed on the extensible frames 30. Thus, the audio and video peripheral devices can be integrated, and the telephone-and-television box can be combined with other electronic peripheral devices in accordance with needs in use. By so designing, the electronic peripheral devices can be integrated and unified by means of the extensible frames 30, thus attaining an effect of multi-functional integration.

One of the special features of this invention is that when the extensible frames 30 of the telephone-and-television box are not used for setting other peripheral devices, the extensible frames 30 can be retracted in the main body 10 to form the first state. At this time, the volume of the telephone-and-television box can be diminished, and the cambered surfaces 322 at another side of the stop portions 32 can make the outer side of the telephone-and-television box formed into an arc shape, letting the telephone-and-television box formed with a beautiful appearance.

In addition, during operation of the telephone-and-television box, a user can make use of the built-in menu of the remote control 20 to let remote control 20 connected with the set top box 11 in the main body 10 so that the user can make use of the remote control 20 to remote operate the set top box 11 to control the TV channel and the sound volume broadcast by the display 200. And, a user can also employ the built-in menu of the remote control 20 to have the remote control 20 connected with the SIM card 12 in the main body 10 so that the user can use the remote control 20 as a handset of a mobile phone for carrying out mobile communication by means of the remote control 20. Thus, the telephone-and-television box of this invention is able to combine the functions of both television and telephone.

After finishing use of the remote control 20, the remote control 20 can be again set on the wireless induction charger 14 of the main body 10 to have the wireless induction charger 14 carrying out wireless charging to the remote control 20 for supplying the remote control 20 with electric energy that the remote control 20 heeds.

Evidently, the telephone-and-television box of this invention is able to combine the functions of both television and telephone, and the extensible frames 30 can be extended outward from the main body 101 to form the second state for setting the speakers 300 and other peripheral devices thereon, thus enabling the telephone-and-television box to integrate other electronic peripheral devices to attain an effect of multi-functional integration and hence advising a fully new-typed TV by which a user can listen to sounds, watch images and converse with people.

Figure 6:
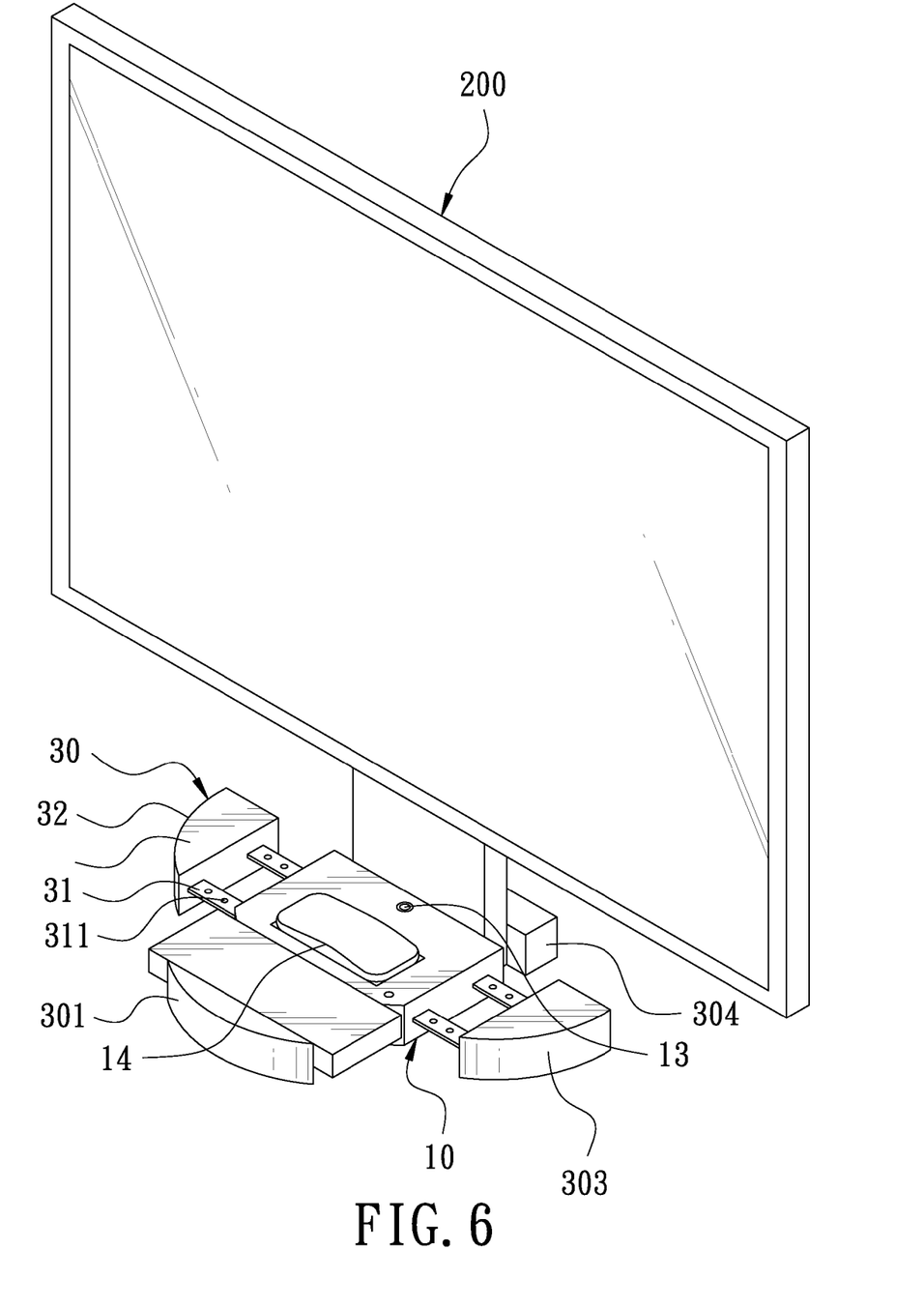
FIG. 6 is a schematic view of the telephone-and-television box able to be placed vertically or horizontally and provided with extensible frames in the present invention, illustrating that the telephone-and-television box is placed horizontally to be used.
Figure 7:
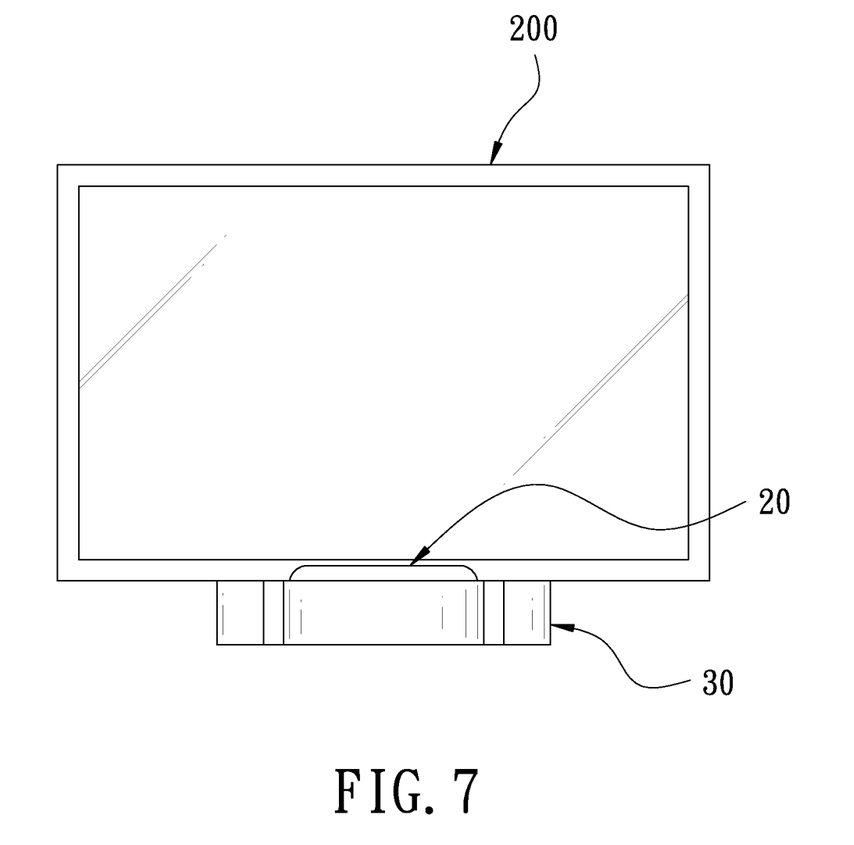
FIG. 7 is a front schematic view of the telephone-and-television box able to be placed vertically or horizontally and provided with extensible frames in the present invention, illustrating that the telephone-and-television box is placed horizontally and the extensible frames are in a closed condition.

FIGS. 6 and 7 show that the telephone-and-television box is placed horizontally for use. Referring to FIGS. 1, 2, 6 and 7, the telephone-and-television box matching the display 200 can be optionally placed horizontally to have the feet of the display 200 locked and fixed in place and have the main body 10 serving as a pedestal of the display 200. Thus, a setting and contract area of the display 200 can be enlarged by making use of the main body 10 and hence, the display 200 can be fixed in place stably and not easy to topple down. What is worth mentioning is that when the telephone-and-television box is placed horizontally, the extensible frames 30 can be extended out of the main body 10 to form the second state for further enlarging the setting and contact area of the display 200, letting the display 200 secured more stably not to topple over.

To sum up, this invention has the following advantages and efficacies:

1. The telephone-and-television box able to be placed vertically or horizontally and provided with extensible frames in the present invention is able to combine the functions of both TV and telephone, and after the extensible frames are extended out of the main body to form the second state, peripheral devices can be set on the extensible frames. Therefore, the telephone-and-television box of this invention is able to integrate other electronic peripheral devices to attain an effect of multi-functional integration.

2. The telephone-and-television box able to be placed vertically or horizontally and provided with extensible frames in the present invention not only can be placed vertically and connected with the display, but also can be placed horizontally and connected with the display to serve as a foundation support of the display and enlarge the setting and contact area of the display for stably fixing the display in place not to topple down.

While the preferred embodiment of the invention has been described above, it will be recognized and understood that various modifications may be made therein and the appended claims are intended to cover all such modifications that may fall within the spirit and scope of the invention.

What is claimed is:

1. A telephone-and-television box able to be placed vertically or horizontally and provided with extensible frames comprising:
   a main body connected with a display, said main body provided therein with a set top box and a SIM card, said main body having a wireless induction charger installed thereon;
   a remote control able to be optionally set on said wireless induction charger of said main body, said remote control able to remote control said set top box, said remote control having wireless induction charging function, said remote control able to be employed as a handset of a mobile phone; and
   at least one extensible frame provided at a peripheral side of said main body, said extensible frame able to be optionally retracted in said main body to form a first state or extended out of said main body to form a second state;
   Said extensible frame able to be used for setting peripheral devices thereon when said extensible frames are extended out of said main body to form said second state.

2. The telephone-and-television box able to be placed vertically or horizontally and provided with extensible frames as claimed in claim 1, wherein said extensible frame is provided with a plurality of retractable rods that are parallel to a lower side of said main body, said retractable rods able to slide axially, said retractable rods able to be optionally retracted in said main body to form said first state or extended out of said main body to form said second state, said retractable rods having their ends transversely provided with a stop portion.

3. The telephone-and-television box able to be placed vertically or horizontally and provided with extensible frames as claimed in claim 2, wherein a plurality of extensible frames are respectively disposed at a left side, at a right side, at a front side and at a rear side of said main body, said stop portion having one side, which faces said main body, formed into a plane surface, said stop portion having another side formed into a cambered surface, said stop portions making said telephone-and-television box integrally formed into an arc shape when said extensible frames are retracted in said main body to form the first state.

4. The telephone-and-television box able to be placed vertically or horizontally and provided with extensible frames as claimed in claim 2, wherein each said retractable rod is bored with plural locking holes.

5. The telephone-and-television box able to be placed vertically or horizontally and provided with extensible frames as claimed in claim 1, wherein said main body is provided thereon with a camera lens.

\* \* \* \* \*